July 25, 1950
E. J. MARCOUILLER
BODY CAVITY CAMERA HAVING
JEWELLED APERTURE MEMBERS
2,516,132
Filed Feb. 1, 1946
2 Sheets—Sheet 2
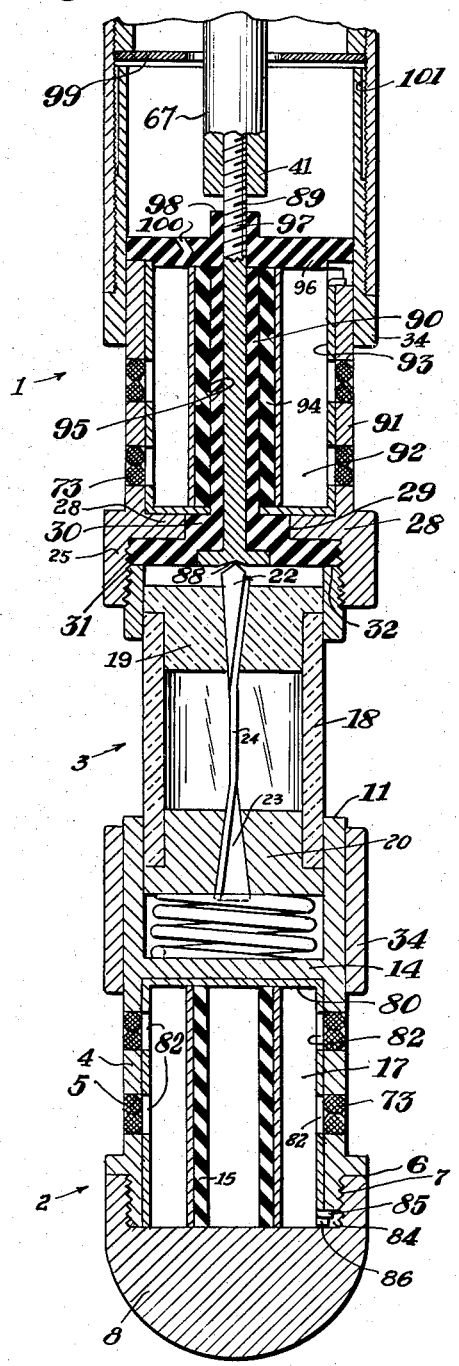
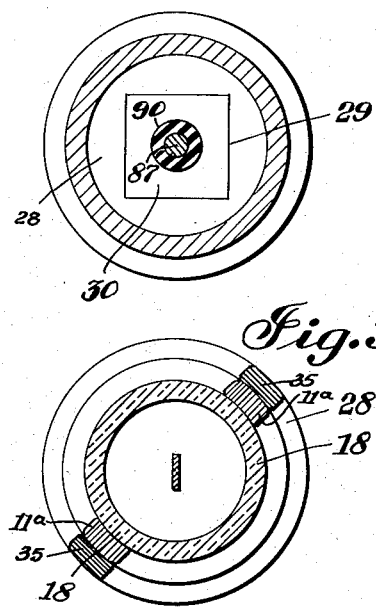
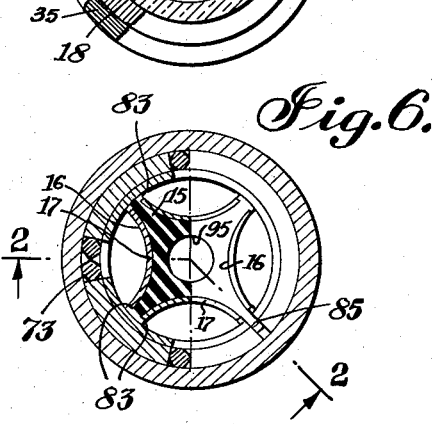
INVENTOR.
Ernest J. Marcouiller
BY Patented July 25, 1950

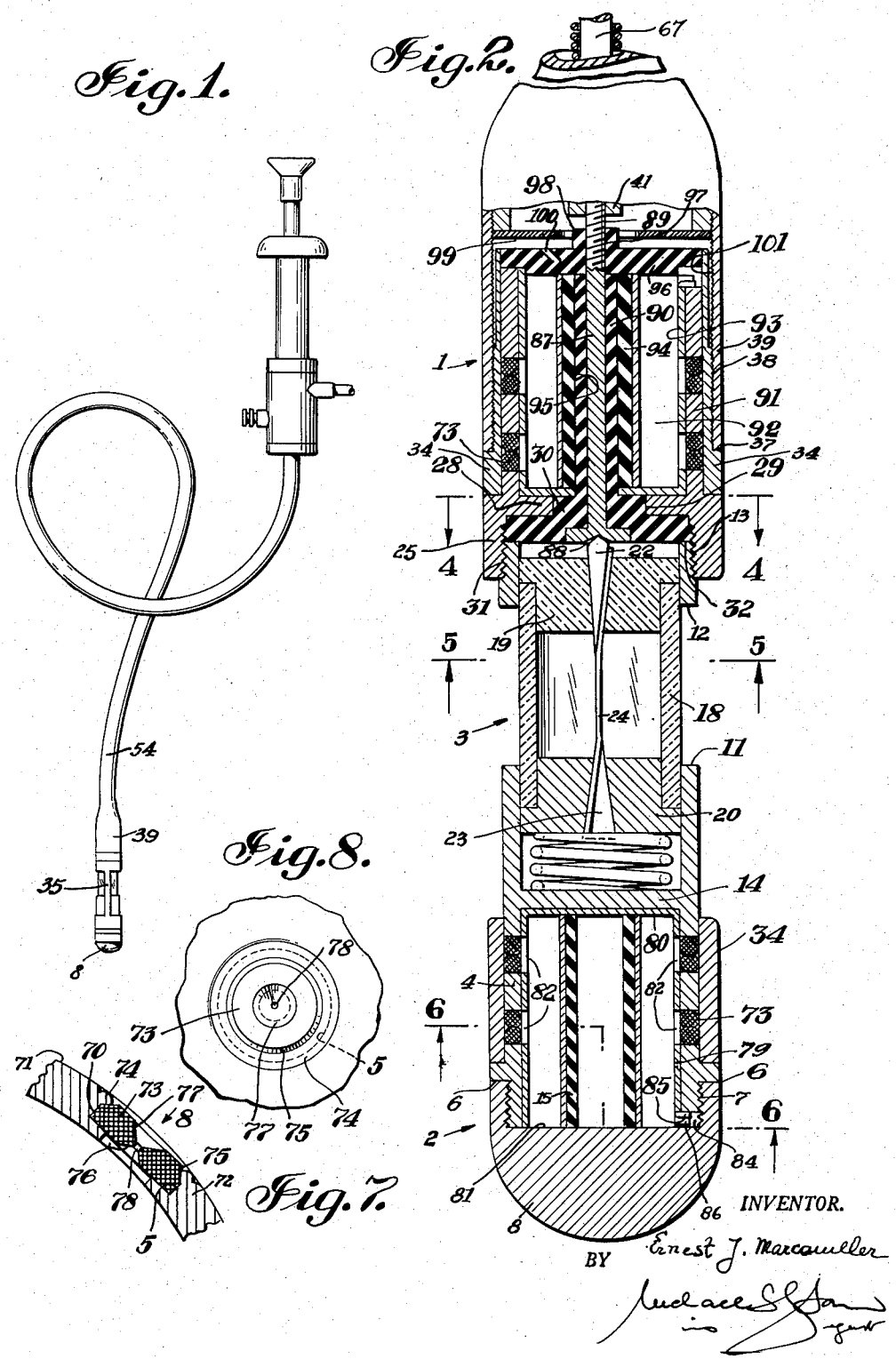

2,516,132

UNITED STATES PATENT OFFICE 2,516,132

BODY CAVITY CAMERA HAVING JEWELED APERTURE MEMBERS

Ernest J. Marcouiller, New York, N. Y.

Application February 1, 1946, Serial No. 644,710

1 Claim. (Cl. 95—11)

My present invention relates to apparatus for taking photographs of cavities of the body of the type described and shown in the U. S. Patents #1,828,141 and #2,349,932.

One of the objects of my present invention is to improve the quality of photographs taken with photographic apparatus of this type by constructing the exposure apertures in such a manner that their size remains permanently constant and does not increase during use of the camera.

It is a further object of my present invention to provide in cameras of the above type exposure means with exposure apertures having permanently the same small size.

It is a further object of my present invention to provide in cameras of this type film carrying means which greatly facilitate insertion and removal of the film portions on which the photographs are taken into and form the tubular cameras forming part of the photographic apparatus.

Another object of my present invention consists in improving photographic cameras of the above described type so as to enable removal of the film supporting members from both tubular cameras without taking the same apart.

Finally, it is also an object of my present invention to construct the above mentioned film supporting members in such a manner that they are adapted to hold the film portions on which the photographs are taken not only while they are located in the tubular cameras but also when they are removed therefrom.

With the above objects in view, my present invention mainly relates to a photographic apparatus for taking photographs of cavities of the body provided with at least one tubular camera having a cylindrical camera wall and consists in providing this tubular camera with a plurality of holes in its cylindrical wall, a plurality of exposure members one in each of these holes firmly secured to the mentioned cylindrical wall, a plurality of small exposure apertures one in each of these exposure members, a tubular shutter adapted to slide along the outer cylindrical surface of the above mentioned tubular camera between inoperative position covering the mentioned small exposure apertures in the exposure members arranged in the holes in the cylindrical camera wall and operative position exposing these exposure apertures in the exposure members, lighting means combined with the said tubular camera, and a shutter operating mechanism attached on the one hand to this tubular camera and the lighting device combined with it and on the other hand to the above mentioned tubular shutter so as to cover and expose said small exposure apertures in the exposure members described above, whenever desired.

The exposure members defined above are made preferably of an opaque non-ferrous and at least substantially acid resistant material which is substantially harder than steel; it is important that this material be acid resistant as mentioned so that it is not attacked by the stomach acids to which it is exposed during use of the camera part of which they form.

I have found it preferable to use for these exposure members small jewels, i. e. semi-precious or precious stones, e. g. red ruby. black onyx and similar stones.

I have also found it advisable to make these exposure members round and disc-shaped and to arrange them in circular holes in the camera wall; furthermore, it is advisable to make the exposure apertures in these round disc-shaped exposure members also circular.

In order to facilitate insertion and removal of the film portions on which the pictures are taken, I provide in each of the tubular cameras a cylindrical film carrying member fitting into the camera and provided with openings corresponding to the exposure apertures in the camera wall; furthermore, I provide a film supporting spider member fitting into this cylindrical film carrying member and adapted to support a plurality of independent film portions opposite the said openings in the film carrying member. Thus, it is possible to insert or remove the film carrying member together with the film supporting member holding the film portions in a very simple way without any danger of the small film portions falling off the film supporting spider member.

The novel features which I consider as characteristic for my invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is a view showing the complete photographic apparatus;

Fig. 2 is an elevational section through the cameras, the lighting device and the shutter mechanism, with the shutter mechanism closing the exposure apertures in the cameras;

Fig. 3 is a section similar to the one shown in Fig. 2 showing the parts in position ready for the making of an exposure, i. e. with the shutter mechanism removed from the exposure apertures of the cameras;

Fig. 4 is a cross section through the intermediate camera along line 4—4 of Fig. 2;

Fig. 5 is a cross section through the lighting device and shutter along line 5—5 of Fig. 2;

Fig. 6 is a cross section through the end camera along line 6—6 of Fig. 2;

Fig. 7 is an enlarged section through a portion of the camera wall showing an exposure member of the type described above; and Fig. 8 is a top view of the exposure member shown in Fig. 7, seen in direction of arrow 8 of Fig. 7.

My improved apparatus comprises an intermediate camera designated 1 and an end camera designated 2 with a lighting device 3 arranged between the same. The cameras 1 and 2 and the lighting device 3 are tubular in form and longitudinally aligned.

The end camera 2 comprises a tubular member 4 having a cylindrical wall provided with four sets of small holes 5. As clearly shown in Figs. 7 and 8, each of these holes 5 is combined with an annular depression 70 provided in the outer face 71 of the cylindrical wall 72 of the camera. A round disc-shaped jewel member 73 is inserted as shown into the depression 70 and secured in this depression by bending the edge portion 74 of wall 72 around the depression 70 over the circular edge 75 of the jewel member 73. The jewel member 73 is furthermore provided with two conical depressions, namely the depression 76 on its inner surface, and the depression 77 on its outer surface. These depressions meet at their deepest points and form, as shown, a very small circular exposure aperture 78 having a diameter of about four thousandths of an inch. The jewel member 73 itself has a diameter of about one sixteenth of an inch and the conical walls of each of the depressions 76 and 77 form an obtuse angle, for instance of about 100 degrees. In this way, it is possible to obtain full exposure of the film portions arranged within the cameras 1 and 2 in the way described farther below in detail.

The lower end of camera 2 is shouldered at 6 and screw threaded at 7 for the purpose of receiving a metallic hemispherical cap 8 which, when in place, abuts the under side of shoulder 6. The hemispherical shape of this cap facilitates the introduction into the cavity to be photographed of the unitary camera structure, i. e. the two cameras 1 and 2 and the lighting device 3 arranged between the same.

The wall of tube 4 above the diaphragms 5 therein is cut away or cut out as shown at 11, to provide a skeleton structure 11a extending longitudinally of the tube as shown in Fig. 5. The upper end of this structure is shouldered as shown at 12 and screw threaded at 13.

The interior of the tube 4 is provided a short distance below the part designated 11 with an internal transverse partition 14.

The above mentioned partition 14 together with the cylindrical wall 72 of the tubular camera 2 forms within this camera a cylindrical space which is closed at one end by the stationary partition 14 and at its other end by the detachable hemispherical cap 8 described above.

Into this cylindrical space a cylindrical film carrying member 79 is inserted as clearly shown in the drawings. This film carrying member 79 is closed at its one end, as indicated by 80, and open at its other end, as indicated by 81. This member is further provided with openings 82 which are arranged so as to be superimposed upon the holes 5 in the camera wall 72, thus enabling exposure of the film portions arranged within the camera.

Within this cylindrical film carrying member 79 a removable spider 15 of suitable insulating material as for instance hard rubber or Bakelite is arranged. This spider is provided with longitudinally extending curved faces 16 which are disposed at an angle of 90° with respect to each other. Each of these curved surfaces 16 is preferably equidistant from the inner end of the holes 5, the curve thereof being struck with the inner ends of the holes 5 as a center.

The spider 15 is provided for the purpose of receiving light sensitive members such as film portions 17 which are shown in place in Fig. 6.

To prevent sliding off of the film portions 17 from the curved film supporting surfaces 16, these surfaces are preferably provided at their outer edges with projections 83 holding the film portions 17 in position and enabling removal of the same only by sliding them in longitudinal direction of the spider 15.

In order to properly locate the film carrying cylindrical member 79 and spider 15 together with the film portions 17 in the camera 2, I provide a small registering cut-out 84 at the lower edge of the camera wall 72, as shown in Figs. 2, 3 and 6 and bend a small registering edge portion 85 of the film carrying member 79 outward so as to fit into the registering cut-out 84. Furthermore, I provide as also indicated in the same figures, at the lower edge of spider 15 a small registering projection 86 fitting into the registering cut-out in the film carrying member 79 which is formed by bending the small registering edge portion 85 of this member outward, as described above. In this way, it is possible to ensure proper positioning of member 79, spider 15 and the film portions 17 during exposure.

When it is desired to remove the film portions 17 or to reload the camera, it is only necessary to unscrew cap 8 and to remove the film carrying member 79 together with spider 15 and the film portions 17 carried by the same.

The light source or lighting means which as a whole is designated 3 is in the form of a tubular member having a glass wall 18 closed at its ends by caps 19 and 20. Cap 19 is of suitable insulating material, the cap 20 of metal. This tubular member passes into the upper end of the camera tube 4 and rests upon a contact spring which in turn seats or rests upon the upper face of the internal partition 14.

The insulating cap member 19 is provided with an electrode 22 and the cap 20 with a similar electrode 23. These electrodes are tapered and secure the ends of a filament 24 in place in the caps 19 and 20. This filament is composed of a highly refractory material, preferably tungsten, and is jammed or clamped at each end between electrodes 22 and 23 and the caps 19 and 20, respectively.

The intermediate camera 1 comprises a tubular member 25 internally threaded so as to telescope and be threaded upon the threaded portion 13 of tube 4. The walls of the tube 25 are provided also with four sets of exposure members 73 provided with exposure apertures 78. The exposure members 73 are of exactly the same type as those provided in the cylindrical wall 72 of the end camera 2 and thus they do not need to be described in detail.

The lower end of tube 25 is provided with a transverse partition 28 which has, as shown in Fig. 4, a central hole 29 having a rectangular cross section. Into this hole 29 fits a square projection 30 forming part of the partition disc 31 which in this way is prevented from turning. In order to prevent movement of this partition disc 31 in longitudinal direction of the camera 1, the edges of this disc 31 are pressed by the upper annular face 32 of the skeleton structure 11a against the partition wall 28. Thus, this disc after assembling of the camera is stationary and cannot be removed except by detaching the lighting device 3 from camera 1.

This disc 31 carries, as clearly shown in Figs. 2 and 3, the rod 87 which has at its lower end a conical depression 88 and at its upper end a screw threaded portion 89. The upper end of the electrode 22 reaches into this conical depression 88 and thus contacts rod 87 which is of metal and serves as conductor for the lighting device 3 described above. This rod member 87 is enclosed, as shown, by an insulating sleeve 90 firmly secured to the square projection 30 on top of disc 31.

As clearly shown in Figs. 2 and 3, the above described partition wall 28 together with the square projection 30 and the circular wall 91 of camera 1 form within this camera a cylindrical space 92 which is open at its top and closed at its bottom. This cylindrical space 92 is similar to the cylindrical space within camera 2, the only difference being that the rod 87 enclosed by the sleeve 90 is permanently positioned within this space 92 and passes through it.

The camera 2 is lined with the film carrying member 93; this member 93 has the same shape as the film carrying member 79, the only difference being that member 93 is provided with a hole 94 through which the rod 87 and lining 90 are passing.

The spider member 94 is arranged within this film carrying member 93. This spider 94 has exactly the same shape as spider 15 in the end camera 2. I wish to note that both spiders 15 and 94 are each provided with a central hole 95; this central hole 95 has no technical importance for the spider 15 arranged in the end camera 2, but in the spider 94 arranged in the intermediate camera 1 it serves for passage of the rod 87 and sleeve 90.

The cylindrical space 92 within the intermediate camera 1 is closed by means of the cover disc 96 provided with a screw threaded hole 97 engaging the screw threaded portion 89 of the stationary rod 87. This cover disc 96 is provided as shown with a central annular projection 98 so as to prevent friction between this disc and the cover member 99 described below in detail.

I wish to note that I might provide in this cover disc a hole 100 which is shaped in such a manner as to prevent light from passing through it. This hole serves for admitting air through the rubber tube 54 into the camera and from there into the cavity to be photographed. This enables creation of an air filled space within the cavity which is necessary for obtaining satisfactory pictures.

It should be stressed that by providing a cover disc 96 and a stationary rod 87 of the above described type and by shaping spider 94 as also described above, it is possible to remove the film carrying member 93 together with spider 94 and the film portions 17 supported by the same without disassembling the camera, simply by unscrewing the cover disc 96.

The exterior of my apparatus is provided with a shutter mechanism for the two cameras and also the necessary mechanism for shifting the cameras relatively to the shutter. This shutter mechanism comprises a tube 34 surrounding both cameras and cut away intermediate its ends to provide a skeleton portion 35 which lies abreast of 11a of the tubular member 4. The tube 34 has a sliding fit on the camera tubes and when in closed position with the holes 5 covered or closed, as shown in Fig. 2, presents a smooth surface for the passage of the device into the cavity to be photographed. This prevents the entry of any foreign material into the holes 5 during the process of insertion of the device into the cavity, while the smooth surface facilitates the insertion of the device and also prevents injury to the membrane of the cavity to be photographed. The upper end of the shutter tube is reduced in diameter to provide a shoulder 37 and threaded externally as shown at 38. Upon this threaded portion 38 is screwed an open ended metal cap 39.

This cap 39 is permanently connected with the rubber tube 54 which connects the photographic cameras with the operating handle in the way shown in Fig. 1. This rubber tube 54 contains the shutter operating member which is usually a resilient wire 67 surrounded by a stiffening wire coil. The wire 67 is provided at its lower end reaching into cap 39 with the internally threaded tube 41. Into this internally threaded tube 41 the upper end of the screw threaded portion 89 of rod 87 is threaded, connecting thereby the operating wire 67 with the unitary camera structure consisting of the cameras 1 and 2 and the lighting device 3.

The cap 39 is also provided with the closing disc 99 mentioned above; this disc 99 is provided with a screw threaded periphery 101 which engages the screw threading on the inner face of cap 39.

By constructing cap 39 as described above and by making rod 87 stationary, it is possible without difficulty to detach the cameras and the shutter mechanism from the operating wire 67 and the rubber tube 54 respectively without exposing to light the film portions arranged within camera 1. The cameras and the shutter mechanism are detached from wire 67 and rubber tube 54 respectively by simultaneously unscrewing the screw threaded end portion 89 of rod 87 from the internally threaded tube 41 and the screw threading 38 at the upper end of the shutter tube 34 from cap 39, respectively, without removing the cover disc 94 from the upper end of the intermediate camera 1.

It will be understood that each of the elements described above, or two or more together, may also find a useful application in other types of photographic apparatus differing from types described above.

While I have illustrated and described the invention as embodied in apparatus for photographing cavities of the human body, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic of specific aspects of this invention and, therefore, such adaptations should and are intended to be comprehended within the meaning and range of equivalence of the following claim.

What I claim as new and desire to secure by Letters Patent is:

In a photographic apparatus for taking photographs of cavities of the body including at least one tubular camera in combination, a cylindrical camera wall; a plurality of circular holes in said cylindrical camera wall; a plurality of round disc-shaped jewel members, each of said jewel members being slightly thinner than said cylindrical camera wall and firmly secured to said cylindrical camera wall in one of said circular holes substantially flush with the outer face of said camera wall; and two conical depressions in each of said round disc-shaped jewel members, one in the inner surface and the other in the outer surface of the same arranged concentrically and opposite to each other in such a manner as to meet at their deepest points and to form a small circular exposure aperture in each of said round disc-shaped jewel members.

ERNEST J. MARCOUILLER.

REFERENCES CITED

The following references are of record in the file of this patent:

UNITED STATES PATENTS

| Number | Name | Date |
|---|---|---|
| 433,323 | Bunge | July 29, 1890 |
| 557,801 | Juan | Apr. 7, 1896 |
| 696,942 | Chesnut | Apr. 8, 1902 |
| 1,440,059 | Colomb | Dec. 26, 1922 |
| 1,642,102 | Colomb | Sept. 13, 1927 |
| 1,782,068 | Hazell | Nov. 18, 1930 |
| 1,828,141 | Back | Oct. 20, 1931 |
| 2,093,399 | Billing | Sept. 21, 1937 |
| 2,247,257 | Shelton | June 24, 1941 |
| 2,258,304 | Stanton | Oct. 7, 1941 |
| 2,259,228 | Rankin | Oct. 14, 1941 |
| 2,349,932 | Back | May 30, 1944 |
| 2,384,655 | Stewart | Sept. 11, 1945 |

FOREIGN PATENTS

| Number | Country | Date |
|---|---|---|
| 108,556 | Germany | Feb. 10, 1900 |
| 135,469 | Germany | Nov. 27, 1902 |